(12) United States Patent
Schwartz et al.

(10) Patent No.: US 6,371,374 B1
(45) Date of Patent: *Apr. 16, 2002

(54) ADJUSTABLE ILLUMINATION SYSTEM FOR A BARCODE SCANNER

(75) Inventors: Eric D. Schwartz; Edward B. Hubben, both of Skaneateles; Brian L. Jovanovski, Syracuse; Vivian L. Hunter, Baldwinsville; Melvin D. McCall, Homer; Gerard F. Beckhusen, Liverpool, all of NY (US)

(73) Assignee: Welch Allyn Data Collection, Inc., Skaneateles Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/704,017

(22) Filed: Nov. 1, 2000

Related U.S. Application Data

(63) Continuation of application No. 09/111,583, filed on Jul. 8, 1998, now Pat. No. 6,164,544.

(51) Int. Cl.[7] .............................................. G06K 7/10
(52) U.S. Cl. ......................... 235/462.42; 235/462.43; 235/462.01
(58) Field of Search ....................... 235/462.42, 462.01, 235/462.2, 462.21, 462.33, 462.41, 462.45, 454, 462.43

(56) References Cited

U.S. PATENT DOCUMENTS

| | | | |
|---|---|---|---|
| 5,473,149 A | 12/1995 | Miwa et al. | 235/462.41 |
| 5,621,203 A | 4/1997 | Swartz et al. | 235/462.11 |
| 5,656,805 A | 8/1997 | Plesko | 235/472.03 |
| 5,777,314 A | 7/1998 | Roustaei | 235/462.42 |
| 5,783,811 A | 7/1998 | Feng et al. | 235/462.42 |
| 5,811,784 A | 9/1998 | Tausch et al. | 235/472.01 |
| 5,814,803 A | 9/1998 | Olmstead et al. | 235/462.01 |
| 5,894,348 A | * 4/1999 | Bacchi et al. | 356/370 |
| RE36,528 E | * 1/2000 | Roustaei | 235/472.01 |
| 6,092,728 A | * 7/2000 | Li et al. | 235/454 |
| 6,164,544 A | * 12/2000 | Schwartz et al. | 235/462.43 |

FOREIGN PATENT DOCUMENTS

| | | |
|---|---|---|
| DE | 24 45727 A1 | 4/1976 |
| EP | 0 431 831 A1 | 11/1990 |
| EP | 0 548 951 A2 | 12/1992 |
| EP | 0 905 537 A1 | 3/1999 |
| EP | 0 944 017 A2 | 9/1999 |
| JP | 11314406 A * | 11/1999 |
| WO | WO 99/41545 | 8/1999 |

* cited by examiner

*Primary Examiner*—Michael G. Lee
*Assistant Examiner*—Jamara A Franklin
(74) *Attorney, Agent, or Firm*—Wall Marjama & Bilinski LLP

(57) ABSTRACT

An apparatus for adjusting the position of a line of light in barcode space that includes a support frame having a rear housing containing a solid state imager and a pair of support arms extending forwardly from the front of the housing. An imaging lens is mounted between the arms for focusing an image of a target in barcode space upon the solid state imager along the optical axis of the imaging lens. Illuminating LEDs are mounted on either side of the imaging lens for illuminating the target. The illumination is passed through a pair of cylindrical lenses that are adjustably mounted upon the distal ends of the arm so that the light can be selectively positioned in barcode space.

40 Claims, 3 Drawing Sheets

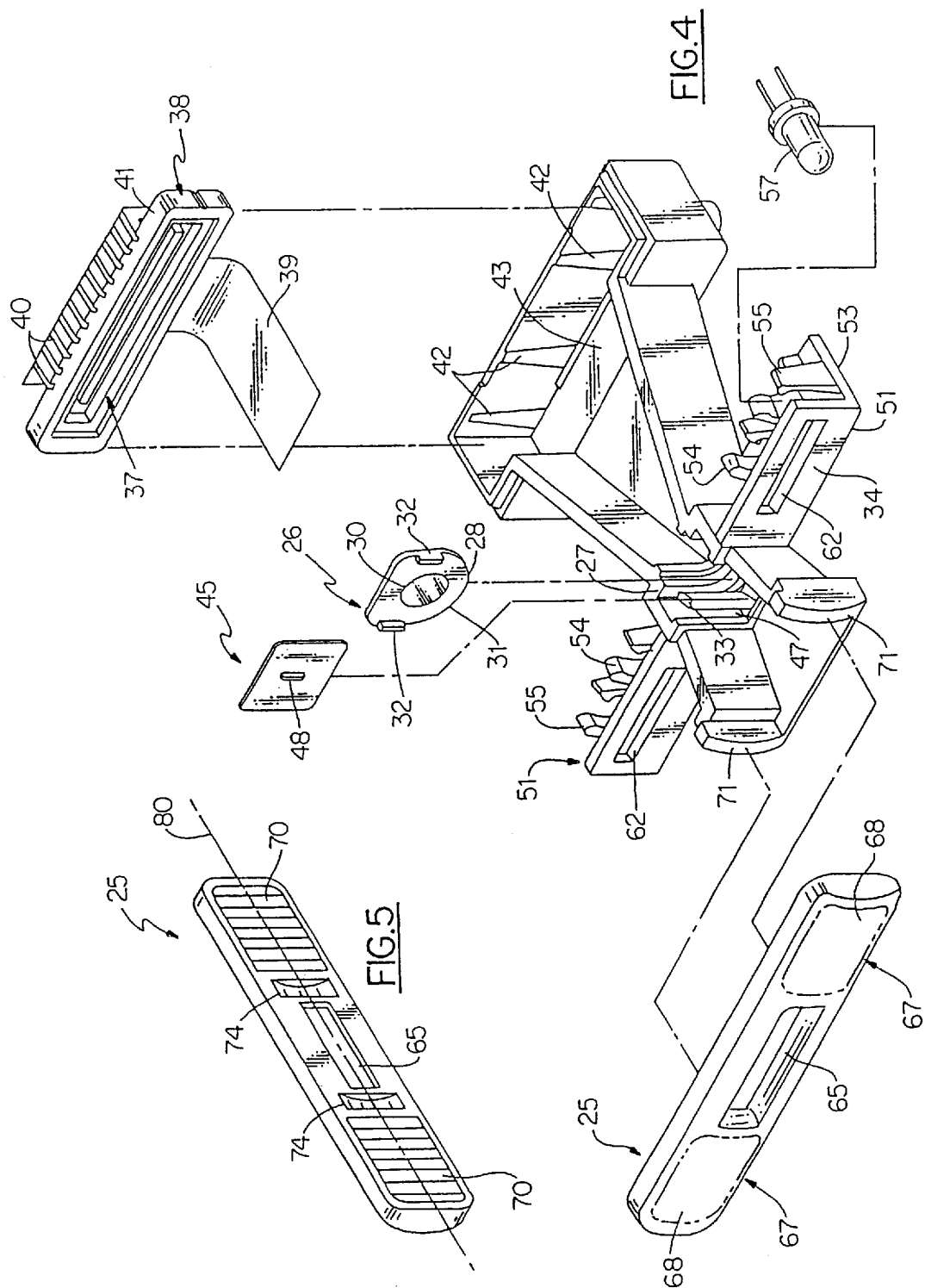

ADJUSTABLE ILLUMINATION SYSTEM FOR A BARCODE SCANNER

CROSS REFERENCE TO RELATED APPLICATION

This is a continuation application of U.S. Ser. No. 09/111,583, Now U.S. Pat. No. 6,164,544 filed Jul. 8, 1998, the entirety of which is incorporated herein by reference.

BACKGROUND OF THE INVENTION

This invention relates to an optical assembly for use in a barcode reader and, in particular, to an adjustable apparatus for positioning a sharp line of illuminator in barcode space.

Although the advantages associated with light emitting diodes (LEDs) when used in barcode scanning equipment are well known, the level of the intensity produced by this type of lamp is relatively low when compared to other light sources, such as halogen lamps or arc lamps. In an effort to improve the effectiveness of light emitting diodes in this application, it is sometimes customary to employ a relatively large number of lamps aligned in one or more rows above or below the imaging lens. As a result, the target region, as well as the periphery of the target region, are flooded with excessive light energy. This approach, however, is space consuming and poses certain assembly and alignment problems.

Optical units have also been devised for providing coplanar illumination wherein the light emitting diodes are mounted in the same plane as the imager on both sides of the imaging lens. Light from the light-emitting diodes is further passed through magnifying lens to project the light onto the barcode target. Additionally, diffusers are used in association with the LEDs to more uniformly distribute the light within the target area. Here again, these optical units overcome many of the problems associated with LED illumination systems.

They nevertheless pose certain other problems relating to bringing the components together in assembly to provide compact, easy to install and adjust units suitable for use in a hand-held long range scanner.

SUMMARY OF THE INVENTION

It is, therefore, a primary object of the present invention to improve barcode readers.

A further object of the invention is to improve hand-held barcode scanners for long range illumination and reading of a barcode target.

A still further object of the present invention is to improve optical devices for use in barcode scanners which are capable of producing a sharply defined line of illumination in barcode space using light emitting diodes.

Another object of the present invention is to provide apparatus for positioning illumination within a desired location in barcode space.

These, and other objects of the present invention, are attained by an apparatus for adjusting the position of a line of light in barcode space that includes a support frame having a rear housing containing a solid state imager and a pair of support arms extending forwardly from the front of the housing. An imaging lens is mounted between the arms for focusing an image of a target in barcode space upon the solid state imager along the optical axis of the imaging lens. Illuminating LEDs are mounted on either side of the imaging lens for illuminating the target. The illumination is passed through a pair of cylindrical lenses that are adjustably mounted upon the distal ends of the arms so that the light can be selectively positioned in barcode space.

BRIEF DESCRIPTION OF THE DRAWINGS

For a better understanding of these and other objects of the present invention, reference will be made in the following detailed description of the invention, which is to be read in association with the accompanying drawings, wherein:

FIG. 4 is a slightly enlarged exploded view in perspective of the present optical assembly; and FIG. 5 is a perspective view showing the back of the half cylinder element.

DESCRIPTION OF THE INVENTION

Figure 1:
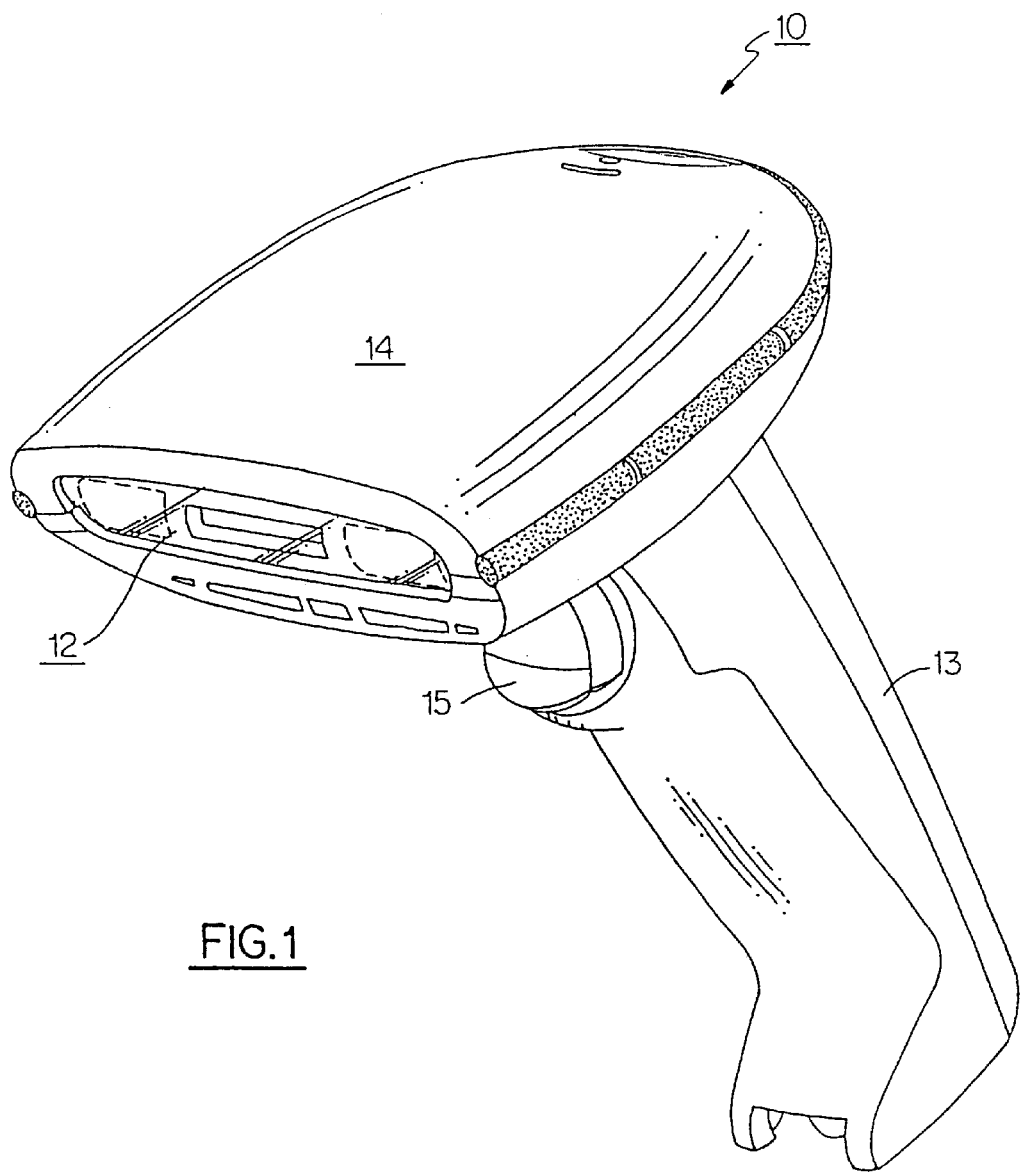
FIG. 1 is a perspective view of a hand-held barcode reader housing the optical assembly of the present invention.
Figure 2:
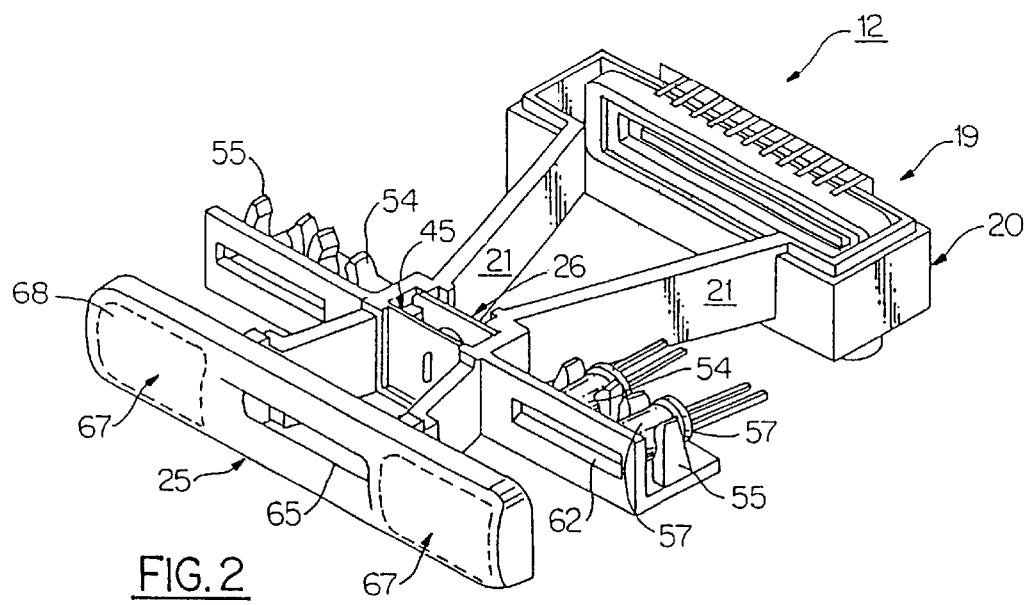
FIG. 2 is an enlarged perspective view showing the optical assembly encompassing the teachings of the present invention.

Turning initially to FIG. 1, there is shown a hand-held long-range barcode scanner 10 that houses the optical assembly 12 of the present invention. The scanner includes a handle 13 that can be easily grasped and held by the user so that the scanner can be rapidly trained upon a barcode target situated some distance from the user. The scanner further includes a contoured reader head 14 mounted on the top of the handle and a trigger 15 for activating the scanner. The scanner preferably is a light-weight, truly portable device that can be easily held and carried about without tiring the user. Accordingly, the reading components of the instrument must be compact, yet easily assembled, aligned and installed within the reader head. As will be explained in detail below, the apparatus of the present invention provides all these advantages while at the same time, delivering an extremely sharp, well-defined line of illumination in barcode space that can be accurately read by a solid state imager.

Figure 3:
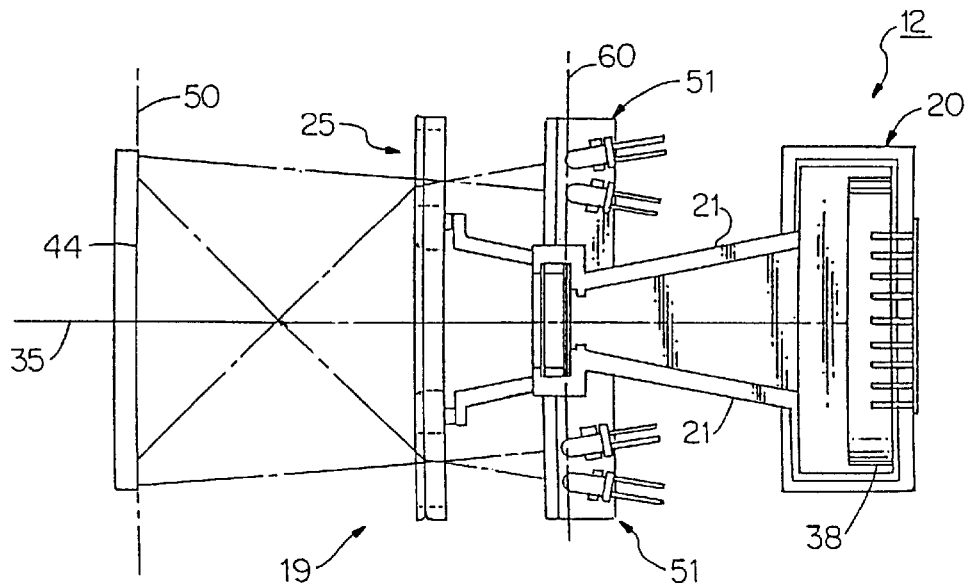
FIG. 3 is a top plan view of the optical assembly illustrated in FIG. 2.

With further reference to FIGS. 2–5, the optical assembly 12 embodying the teachings of the present invention includes a single piece frame 19 molded from high strength light-weight plastic. The frame further includes a rectangular-shaped housing 20 and a pair of forwardly extended arms 21–21. The arms, as viewed from above, in FIG. 3 are in an X configuration with an elongated optical element 25 mounted at the distal end of the arms, the function of which will be explained in greater detail below.

A lens card 26 (FIG. 4) is slidably received within a vertically disposed guideway 27 located at the neck formed by the arms. The lens card is molded from a single material and includes a flat lens each of 28 surrounding a single imaging lens 30. The bottom surface 31 of the holder is arcuate-shaped and adapted to seat within a complimentary groove situated in the bottom of the guideway. A pair of tabs 32–32 are carried on the front face of the lens holder each of which, in assembly, rests on the top surface of stanchions 33, the stanchions forming the front rails of the guideway. The tab serves to locate the imaging lens within the frame and prevents the lens card from being inserted into the frame in an inverted position.

Once properly mounted in the frame, the imaging lens defines the optical axis 35 (FIGS. 2) of the system. A solid state image sensor or imager 37, which preferably is a charge coupled device (CCD), is mounted within a support 38 and is coupled to a flexible ribbon connector 39 by a series of leads 40 mounted along the top apron 41 of the support. The support is passed downwardly into the housing against locating ribs 42—42 molded into the back wall of the housing, and is seated upon the floor 43 of the housing. The solid state imager is aligned within the housing so that it is centered upon the optical axis of the system a given distance from the imaging lens so that an image of a target 44 in barcode space is focused upon the image recording surface of the imager by the imaging lens. A system for mounting an image sensor in an imaging device is described in detail in copending application Ser. No. 09/112,028, filed Jul. 8, 1998 entitled "Image Sensor Mounting System" filed concurrently herewith, assigned to the Assignee of the present invention, and incorporated herein. As is shown in that application, it is indicated that a frame carrying optical and imager components may be mounted on a printed circuit board.

An aperture card 45 is slidably contained within a second guideway 47 positioned in front of the first guideway at the neck of the "X" shaped arms. The aperture card contains a vertically-extended stop aperture 48 that is centered upon the horizontal optical axis of the system. When the card is mounted in the guideway, the vertical orientated long dimension of the aperture is arranged so that the long dimension is parallel to the longer dimension of a one-dimensional (ID) barcode target situated in the object plane 50 of the imaging lens.

The terms horizontal and vertical are used herein with respect to relative locations of various components of the optical system and not necessary as to the exact location of the components in space.

A pair of lamp brackets 51—51 are mounted on either side of the frame at the neck. Each bracket is of similar construction and includes a platform 53 and a front wall 54. As best illustrated in FIG. 4 each platform has a pair of clips 54 and 55 mounted thereon that are perpendicularly aligned with the optical axis of the system. A light emitting diode (LED) 57 is mounted in each clip so that the distal end of each lamp lies substantially within the plane 60 (FIG. 3) described by the imaging lens to furnish the system with what is known as coplanar illumination.

The front wall 34 of each lamp bracket contains a horizontally disposed field stop 62 that is positioned immediately in front of the LEDs preferably almost in contact with the lamps.

The elongated optical element 25 mounted at the distal end of the frame arms is shown in greater detail in FIGS. 4 and 5. The optical element is formed of an elongated semi-circular shaped piece of optical glass having a rectangular-shaped opening 65 centrally formed therein. The opening is of a size and shape such that an image of a target in barcode space can freely pass optically undisturbed as it moves along the optical axis 35 of the system.

Cylindrical lens elements 67—67 are located on either side of the opening through which illumination from the LEDs pass. Each cylindrical lens images the associated field stop in barcode space to produce a sharp horizontal line of light at the target. A diffuser is mounted at the light entrance face of each illumination lens element. The diffuser can be either a gradient or a non-gradient diffuser. Preferably, a gradient diffuser is employed having 5° of diffusion at its outer edge and 40° of diffusion at its inner edge.

The LEDs mounted in the inboard clips 54 of each lamp bracket is canted at an angle with respect to the optical axis so that the light beam from the lamps is directed to one outer side edge of the target region. The lamps mounted in the outboard clips 55 are similarly canted to direct the light beams from the outboard lamps toward the center of the target region. The positioning of the lamps along with the use of a single axis diffuser and a field stop aperture severs to create a sharp uniform line of light across the barcode target that can be accurately recorded by the CCD imager.

As illustrated in FIG. 4, the distal end of each arm of the frame contains an arcuate shaped camming surface 71 that lies in a vertical plane that is parallel with the optical axis of the system. The camming surfaces are received in complimentary cut-outs 74 formed in the plano back surface of the optical element 25 with the cut-outs being centered upon the center line of 80 of the optical element 25. Preferably, each camming surface describes an arc of a circle about which the cylindrical illuminating lenses carried by the elongated optical element can be rotatably adjusted within a plane. The center of curvature of the camming surfaces are coincident with the center of curvature of the front surface 68 of the optical element 67. Accordingly, the illumination lenses can be rotatably adjusted so that the line of illumination that is produced is coincident with the object plane of the imaging lens. As can be seen, a slight rotation of the element along the camming surface will angularly offset the plano entrance face of the two illumination lens elements with respect to the axis of the incoming light beam, thus altering the position of the line of light produced in the plane of the barcode target. Accordingly, during assembly of the optical reader components on the frame, the line of illumination can be easily and accurately adjusted in barcode space. Once adjusted, the optical element is permanently held in place by ultrasonically welding the optical element to the frame. Any other means for holding the optical element 25 in a desired position within the frame may be similarly employed without departing from the teachings of the present invention.

One example of an optical assembly suitable for use in a barcode reader involves a ingle element plastic lens having a focal length of approximately 30 mm.

The lens is positioned approx 39 mm in front of a linear array CCD, so an image of a target in barcode space is formed at the image plane of the lens at a magnification of approx 1/3.5×. The aperture stop of the lens can be either elliptical or rectangular in shape, having an aspect ratio of at least 3:1 and preferably 6.0 or 8:1. The longer dimension of the aperture is oriented vertically, so the long dimension of the aperture is parallel to the longer dimension of a 1D barcode. The CCD of choice is a chip developed specifically for barcode reading, the photosensitive elements (pixels) having a 25:1 aspect ratio. Again, the longer dimension of the pixels will be aligned parallel to the barcode.

The illumination system consists of four LEDs in standard T 13/4 packages. Two LEDs will be arranged on either side of the imaging lens. The LEDs will lie in the same plane as the imaging lens, to provide coplanar illumination. In front of the LEDs, almost in contact with them is a field stop. The field stop is simply a horizontal slit having a height of about=0.040 to 0.050". The field stop is imaged into barcode space by a cylindrical lens having a focal length of about 25 mm. The magnification of the cylinder lens is approx 6×, so the result is a sharp horizontal line, 0.24" to 0.36" in height. Also included in the illumination system is a single axis diffuser, located in contact with the cylinder lens. This diffuser serves to homogenize the light in the horizontal plane, improving the uniformity of the distribution of the light.

While this invention has been explained with reference to the structure disclosed herein, it is not confined to the details set forth and this invention is intended to cover any modifications and changes as may come within the scope of the following claims:

What is claimed is:

1. A method for manufacturing an illumination assembly for an optical reader, said method including the steps of:
   providing a frame;
   mounting an illumination source to said frame;
   positioning a shaping optical element forward of said illumination source;
   observing a pattern imaged onto a target by said shaping optical element;
   adjusting a position of said pattern by adjusting a position of said optical element relative to said illumination source; and
   fixing a position of said shaping optical element relative to said illumination source when a desired position for said pattern is attained.

2. The method of claims 1, wherein said fixing step includes the step of ultrasonically welding said optical element to said frame.

3. The method of claim 1, wherein said providing step includes the steps of providing a camming surface on said frame, wherein said positioning step includes the step of positioning an optical element having a complementary camming surface forward of said illumination source and wherein said adjusting step includes the step of abutting said camming surfaces together during said adjusting step.

4. The method of claim 3, wherein said providing step includes the step of providing an aperture stop on said frame, and wherein said mounting step includes the step of mounting an LED rearward of said aperture stop.

5. The method of claim 3, wherein said providing step includes the step of providing a pair of aperture stops on said frame, and wherein said mounting step includes the step of mounting an LED rearward of said each aperture stop.

6. The method of claim 3, wherein said providing step includes the step of providing an aperture stop on said frame, wherein said mounting step includes the step of mounting an LED rearward of said aperture stop, and wherein said positioning step includes the step of positioning a cylindrical lens forward of said aperture stop.

7. The method of claim 3, wherein said providing step includes the step of providing an aperture stop on said frame, and wherein said mounting step includes the step of mounting an LED rearward of said aperture stop.

8. The method of claim 1, wherein said mounting step includes the step of mounting an LED to said frame.

9. The method of claim 1, wherein said providing step includes the step of providing an aperture stop on said frame, and wherein said mounting step includes the step of mounting an LED rearward of said aperture stop.

10. The method of claim wherein said providing step includes the step of providing a pair of aperture stops on said frame, and wherein said mounting step includes the step of mounting an LED rearward of said each aperture stop.

11. The method of claim 1, wherein said providing step includes the step of providing an aperture stop on said frame, wherein said mounting step includes the step of mounting an LED rearward of said aperture stop, and wherein said positioning step includes the step of positioning a cylindrical lens forward of said aperture stop.

12. The method of claim 1, wherein said providing step includes the step of providing an aperture on said frame, wherein said mounting step includes the step of mounting an LED rearward of said aperture stop, and wherein said observing step includes the step of observing an image of said aperture stop imaged onto a target by said shaping optical element.

13. The method of claim 1, further comprising the step of disposing an aperture stop forward of said illumination source, wherein said observing step includes the step of observing an image of said aperture stop imaged onto said target by said optical elements.

14. A method for making an optical reader having an illumination light source, said method comprising the steps of:
   providing a member having an optical element receiving surface;
   positioning an optical element forward of said member, said optical element having an engaging surface adapted to engage said receiving surface in a plurality of relative positions, said optical element adapted to image light from said source to project a pattern on a target;
   abutting said engaging surface against said receiving surface;
   adjusting a position of said pattern on said target by adjusting a position of said engaging surface on said receiving surface; and
   fixing a position of said engaging surface relative to said receiving surface when a desired position for said pattern on said target is attained.

15. The method of claim 14, wherein said engaging surface and said receiving surface are complementary camming surfaces.

16. The method of claim 14, wherein said fixing step includes the step of ultrasonically welding said optical element to said member.

17. The method of claim 14, wherein said method further includes the step of disposing a slit aperture forward of said light source and forming a cylindrical lens on said optical element so that a line pattern is imaged onto said target by said optical element.

18. A method for manufacturing an illumination assembly for an optical reader, said method including the steps of:
   providing a support;
   mounting an illumination source to said support;
   positioning at least an optical element forward of said illumination source;
   observing a pattern projected onto a target by said combination of said at least said optical element and illumination source;
   adjusting a position of said pattern by adjusting a position of said optical element relative to said illumination source; and
   fixing a position of said optical element relative to said illumination source when a desired position for said pattern is attained.

19. The method of claim 18, wherein said support at least partially comprises a frame.

20. The method of claims 18, wherein said support at least partially comprises a printed circuit board.

21. The method of claim 18, wherein said optical element comprises a lens which converges light rays from said illumination source.

22. The method of claim 18, wherein said optical element is included on an optical device that further includes an optical element that homogenizes light in a horizontal direction.

23. The method of claim 18, wherein said fixing step includes the step of ultrasonically welding said optical element to said support.

24. The method of claim 18, wherein said providing step includes the steps of providing a camming surface on said support, wherein said positioning step includes the step of positioning an optical element having a complementary camming surface forward of said illumination source and w herein said adjusting step includes the step of abutting said camming surfaces together during said adjusting step.

25. The method of claim 18, wherein said mounting step includes the step of mounting an LED to said support.

26. The method of claim 18, wherein said providing step includes the step of providing an aperture stop on said support, wherein said mounting step includes the step of mounting an LED rearward of said aperture step.

27. The method of claim 26, wherein said aperture stop is integrated on said support.

28. The method of claim 18, wherein said method further comprises the step of disposing an aperture stop forward of said illumination source.

29. The method of claim 28, wherein said disposing step further comprises the step of integrating an aperture stop icon said support forward of a mounting position of said illumination source.

30. The method of claim 18, wherein said providing step includes the step of providing a pair of aperture stops on said support, and wherein said providing step includes the step of providing a pair of aperture stops on said support, and wherein said mounting step includes the step of mounting an LED rearward of said each aperture stop.

31. The method of claim 18, wherein said providing step includes the step of providing an aperture stop on said support, wherein said mounting step includes the step of mounting an LED rearward of said aperture stop, and wherein said positioning step includes the step of positioning a cylindrical lens forward of said aperture stop.

32. The method of claim 18, wherein said providing step includes the step of providing an aperture stop on said support, and wherein said mounting step includes the step of mounting an LED rearward of said aperture stop.

33. The method of claim 18, wherein said providing step includes the step of providing a pair of aperture stops on said support, and wherein said mounting step includes the step of mounting an LED rearward of said each aperture stop.

34. The method of claim 18, wherein said providing step includes the step of providing an aperture stop on said support, wherein said mounting step includes the step of mounting an LED rearward of said aperture stop, and wherein said positioning step includes the step of positioning a cylindrical lens forward of said aperture stop.

35. The method of claim 18, further comprising the step of disposing an aperture stop forward of said illumination source, wherein said observing step includes the step of observing an image of said aperture stop imaged onto said target by said optical elements.

36. The method of claim 35, wherein said optical element is adapted to converge light rays from said source.

37. The method of claim 35, wherein said engaging surface and said receiving surface are complementary camming surfaces.

38. The method of claim 35, wherein said fixing step includes the step of ultrasonically welding said optical element to said member.

39. The method of claim 35, wherein said method further includes the step of disposing an aperture forward of said light source and forming cylindrical lens on said optical element so that a line pattern is imaged onto said target by said optical element.

40. A method for making an optical reader having an illumination light source, said method comprising the steps of:

providing a member having an optical element receiving surface;

positioning an optical element forward of said member, said optical element having an engaging surface adapted to engage said receiving surface in a plurality of relative positions, said optical element adapted to shape light from said source to project a pattern on a target;

abutting said engaging surface against said receiving surface;

adjusting a position of said pattern on said target by adjusting a position of said engaging surface on said receiving surface; and fixing a position of said engaging surface relative to said receiving surface when a desired position for said pattern on said target is attained.

\* \* \* \* \*